United States Patent
Conny

(10) Patent No.: US 9,573,629 B2
(45) Date of Patent: Feb. 21, 2017

(54) SAFETY RAIL FOR A FLATBED TRAILER

(71) Applicant: Safe D Rail, Inc., Alliance, OH (US)

(72) Inventor: Dawn M Conny, Alliance, OH (US)

(73) Assignee: Safe D Rail, Inc., Alliance, OH (US)

(*) Notice: Subject to any disclaimer, the term of this patent is extended or adjusted under 35 U.S.C. 154(b) by 49 days.

(21) Appl. No.: 14/694,455

(22) Filed: Apr. 23, 2015

(65) Prior Publication Data
US 2016/0311474 A1   Oct. 27, 2016

(51) Int. Cl.
*B62D 33/02* (2006.01)
*E04G 5/14* (2006.01)

(52) U.S. Cl.
CPC ............ *B62D 33/0207* (2013.01); *E04G 5/142* (2013.01)

(58) Field of Classification Search
CPC .. B62D 33/0207; B62D 33/0215; B60J 7/064; B60J 7/065; E04G 5/142
USPC .......................... 296/1.04, 182.1, 43, 100.12, 100.13,296/100.18, 100.15, 100.16; 182/113
See application file for complete search history.

(56) References Cited

U.S. PATENT DOCUMENTS

| | | | | |
|---|---|---|---|---|
| 4,342,480 A | * | 8/1982 | Ross, Jr. ................ | B60J 7/062 296/100.12 |
| 5,080,422 A | * | 1/1992 | DeMonte ................ | B60J 7/062 296/100.12 |
| 5,749,436 A | * | 5/1998 | Satchwell, III ......... | B60R 3/005 182/113 |
| 6,053,281 A | * | 4/2000 | Murray ................... | E04G 21/3223 182/113 |
| 6,183,036 B1 | * | 2/2001 | Coulson ................... | B60J 7/062 296/100.13 |
| 8,632,099 B2 | * | 1/2014 | Conny .................... | B60R 3/005 182/113 |
| 9,403,486 B2 | * | 8/2016 | May ....................... | B60R 3/005 |
| 2003/0020253 A1 | * | 1/2003 | Albert Bosman ....... | B60R 3/005 280/164.1 |
| 2004/0173406 A1 | * | 9/2004 | Lantz ...................... | E06C 7/006 182/113 |
| 2007/0080557 A1 | * | 4/2007 | Knepper .................. | B60J 7/02 296/105 |
| 2012/0048648 A1 | * | 3/2012 | Meacham ................ | E04G 5/14 182/113 |
| 2013/0180428 A1 | * | 7/2013 | Klotz ...................... | B60P 1/00 105/393 |
| 2013/0249237 A1 | * | 9/2013 | Damsi ..................... | B60J 7/022 296/100.12 |
| 2015/0298613 A1 | * | 10/2015 | May ........................ | B60R 3/005 182/113 |

* cited by examiner

Primary Examiner — Jason S Morrow
(74) Attorney, Agent, or Firm — Sand & Sebolt

(57) ABSTRACT

A safety rail for a flatbed trailer including a track that is engaged adjacent an edge of the flatbed trailer and a plurality of post holder assemblies engaged with the track. The post holder assemblies are selectively movable along the track between an operational position and a storage position. When the safety rail is in the operational position, the post holder assemblies are spaced a distance apart from each other and, when in the storage position, the post holder assemblies are in tongue-and-groove interlocking engagement with each other. A post is engaged with each of the post holder assemblies and a cable is threaded through an aperture in each of the posts. The post holder assemblies include one or more wheels which engage the track and roll therealong as the safety rail is moved between the operational and storage positions.

18 Claims, 15 Drawing Sheets

SAFETY RAIL FOR A FLATBED TRAILER

BACKGROUND OF THE INVENTION

Technical Field

This invention relates generally to truck trailers. More particularly, this invention is directed to a safety rail for a flatbed trailer. Specifically, the invention is directed to a safety rail that is movable between a storage position and an operational position by rolling post holder assemblies and posts engaged therewith along a track mounted on the trailer and thereby straightening a cable which extends between the posts so that the cable forms a barrier which will aid in preventing an operator from falling off the trailer bed.

Background Information

Flatbed trailers are used to transport goods on a horizontal surface which lacks side and/or end walls. The goods are typically secured in place on the trailer bed by means of tie-downs which extend laterally across the load. One of the problems with this type of trailer bed is that an operator may have to climb onto the horizontal surface and move therealong during loading or unloading of goods. The horizontal surface is located a distance above the ground and there is consequently a risk that the operator may accidentally fall off the bed and onto the ground, thereby injuring themselves.

SUMMARY

There is therefore a need for a device or apparatus to aid in preventing accidental falls from the bed of a flatbed trailer. The present disclosure is directed to a safety rail that may be provided on a flatbed trailer or may be retrofitted thereon. The safety rail may be moved into a storage position it is not needed to protect an operator and may be moved into an operational position when it is needed to protect an operator. The safety rail is configured so that a single operator may quickly and easily move the safety rail between the operational and storage positions without needing to actuate additional mechanical systems on the trailer.

The safety rail includes a plurality of post holder assemblies that are selectively engaged with a rub rail or track that extends along an edge of the trailer bed. The posts are selectively movable along the rub rail or track from an operational position where the posts are spaced at intervals from each other and a storage position where the posts in interlocking engagement with each other. At least one cable is threaded through aligned apertures defined in the posts. The cable is stretched taut when the posts are moved apart and is folded up when the posts are moved together. When in the cable is stretched taut it forms a barrier which aids in preventing accidental falls from the trailer bed.

In one aspect, the invention may provide a safety rail for a flatbed trailer which includes a track adapted to be engaged on the flatbed trailer; a plurality of post holders, where each post holder is engaged with the track and is selectively movable therealong; a plurality of posts, with each post being engaged with one of the post holders; and a cable threaded through an aperture in each of the posts.

In another aspect, the invention may provide in combination a flatbed trailer having a front end, a rear end and opposed sides; a rail assembly provided on the trailer, wherein the rail assembly is movable between an operational position and a storage position; and the rail assembly includes: a plurality of post holder assemblies positioned along one or more of the front end, rear end or the sides of the trailer; a post engaged with each of the post holder assemblies; and a cable extending between the posts; and wherein the post holder assemblies are movable along the one or more of the front end, rear end or sides of the trailer when the rail assembly is moved between the operational and storage positions; and wherein adjacent post holder assemblies are spaced a distance apart from each other when the rail assembly is in the operational position and are spaced in close proximity to each other when the rail assembly is in the storage position. The combination may further include a track mounted along the one of the front end, rear end or the side of the trailer; and wherein the post holder assemblies are engaged with the track and are movable therealong.

In another aspect, the invention may provide a method of providing a safety rail along an edge of a flatbed trailer including the steps of providing a rail assembly having a plurality of post holder assemblies, a post engaged with each of the post holder assemblies; and a cable extending between the posts; mounting a track along the edge of the flatbed trailer; engaging each of the post holder assemblies on the track; moving the post holder assemblies apart from each other along the track; and straightening sections of the cable as the post holders move apart.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
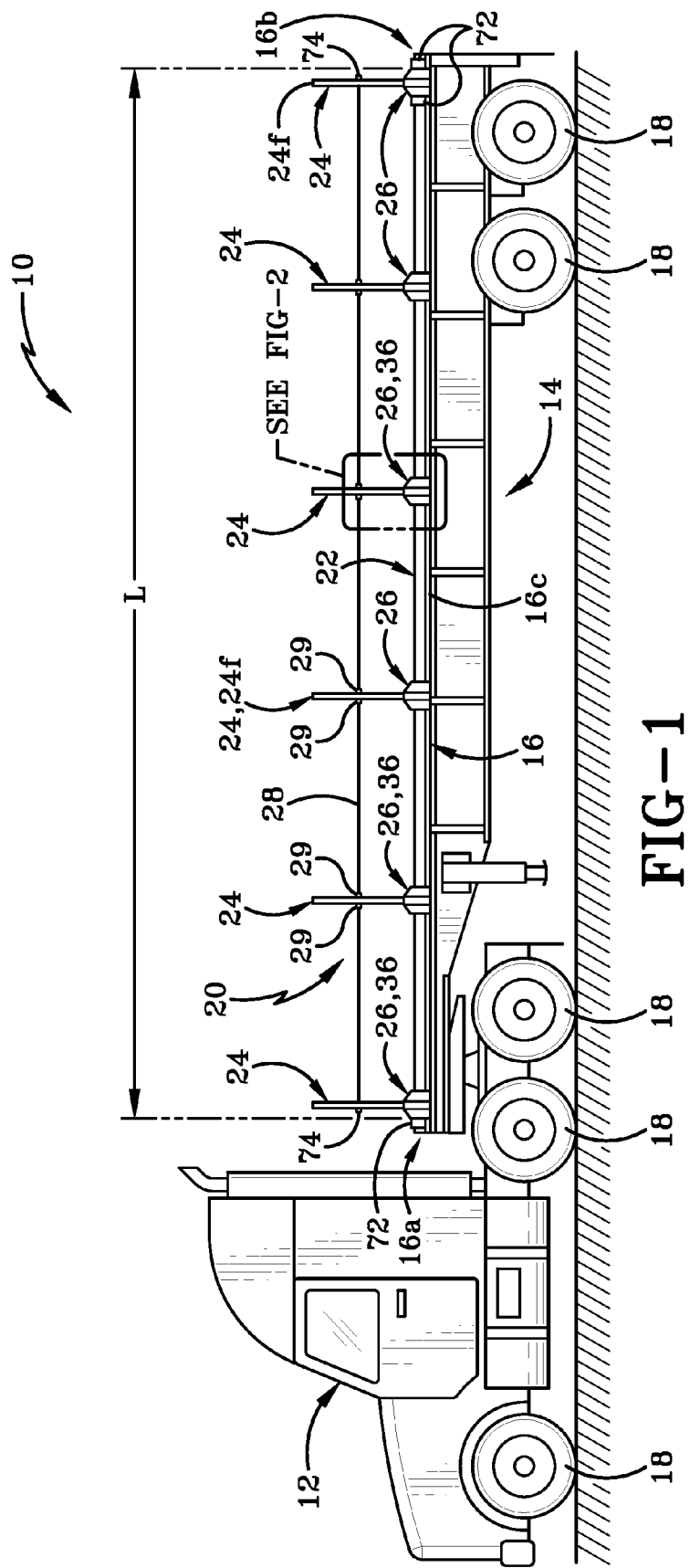
FIG. 1 is a side view of a truck including a tractor and a flatbed trailer engaged therewith and a rail assembly in accordance with an aspect of the invention shown in an operational position.
Figure 11:
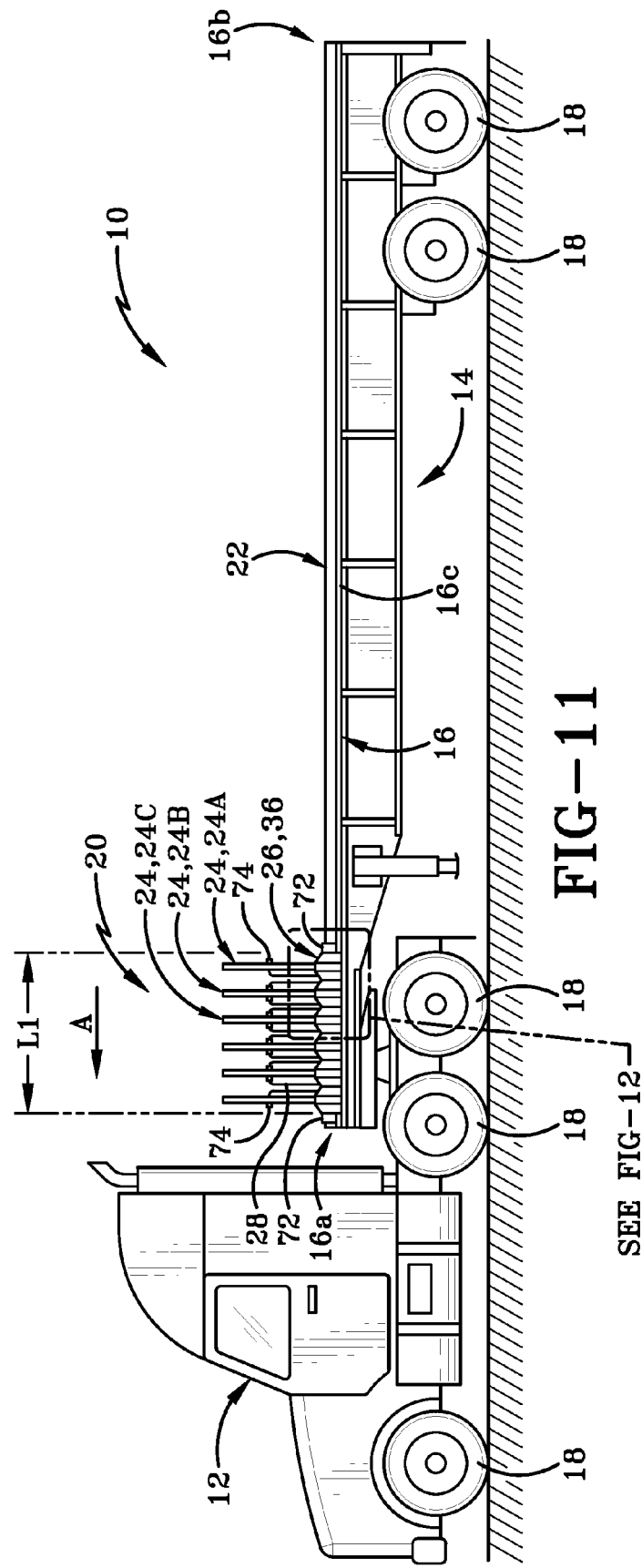
FIG. 11 is a side elevational view of the tractor and trailer with the rail assembly in a storage position.

Referring to FIGS. 1 and 11 there is shown a truck 10 comprising a tractor 12 and a trailer 14. Trailer 14 is a flatbed trailer having a horizontal bed 16 with a front end 16a, a rear end 16b and sides 16c. Truck 10 also includes a plurality of wheels 18.

A rail assembly 20 is provided on trailer 14. Rail assembly 20 comprises a pair of tracks 22 (one for each side of trailer 14), a plurality of posts 24, a plurality of post holder assemblies 26, and at least one cable 28 for each side of trailer 14.

Figure 5:
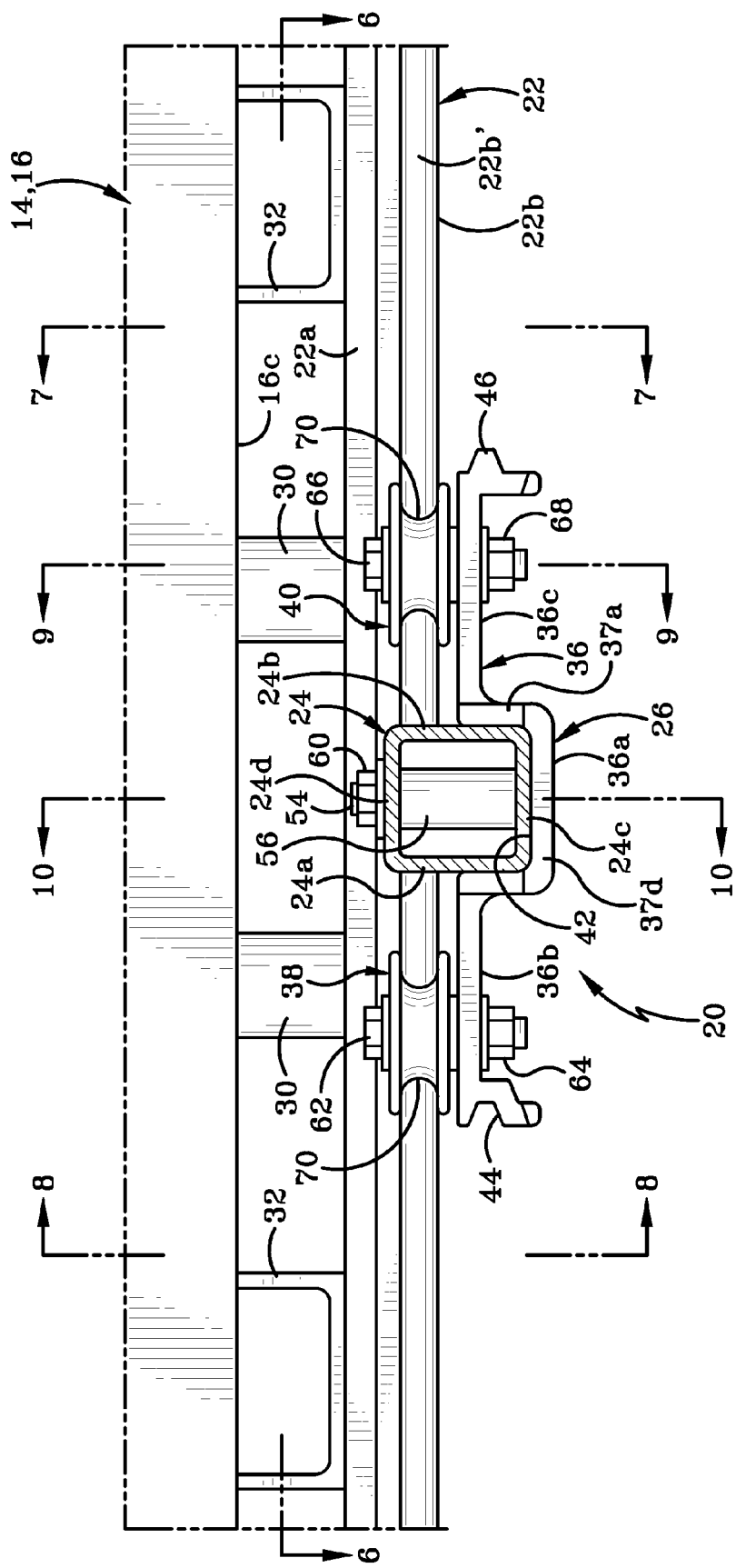
FIG. 5 is a top view of the post holder, the post and part of the trailer bed taken along line 5-5 of FIG. 2.
Figure 7:
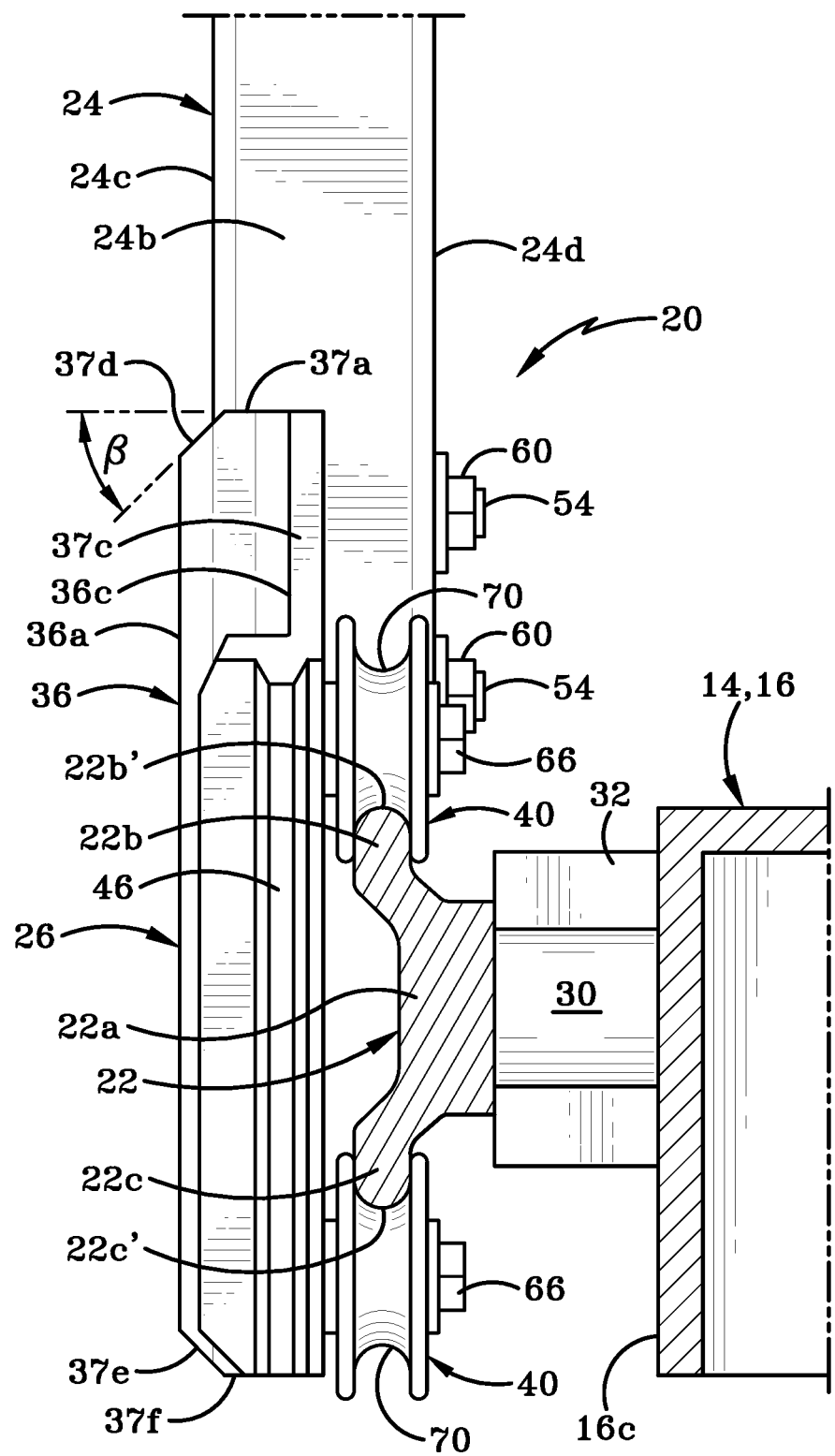
FIG. 7 is a rear cross-sectional view of the post holder and post taken along line 7-7 of FIG. 5 which shows the post holder engaged with the track and showing the tongue portion of the post holder.

Only one track 22 will be illustrated and described herein but it will be understood that another track is engaged with the opposite side of the trailer 14 (which is not illustrated in these figures). Track 22 is best seen in FIGS. 5 and 7 mounted to side 16c of trailer 14. Spacers 30 and U-shaped brackets 32 may be positioned between track 22 and side 16c. Track 22 may be welded or otherwise secured to these spacers 30 and brackets 32 such that a gap 34 is defined between track 22 and side 16c. Track 22 runs substantially parallel to a longitudinal axis of trailer 14, where that longitudinal axis extends from front end 16a of bed 16 to rear end 16b thereof. Track 22 also runs from proximate front end 16a of bed 16 to proximate rear end 16b thereof.

As best seen in FIG. 7 track 22 includes a central region 22a with a first flange 22b extending upwardly therefrom and a second flange 22c extending downwardly therefrom. First flange 22b terminates in a curved upper surface 22b' and second flange 22c terminates in a curved lower surface 22c'. The upwardly extending flange 22b and downwardly extending flange 22c aligned vertically with each other and are oriented generally parallel to side 16c of bed 16.

Figure 2:
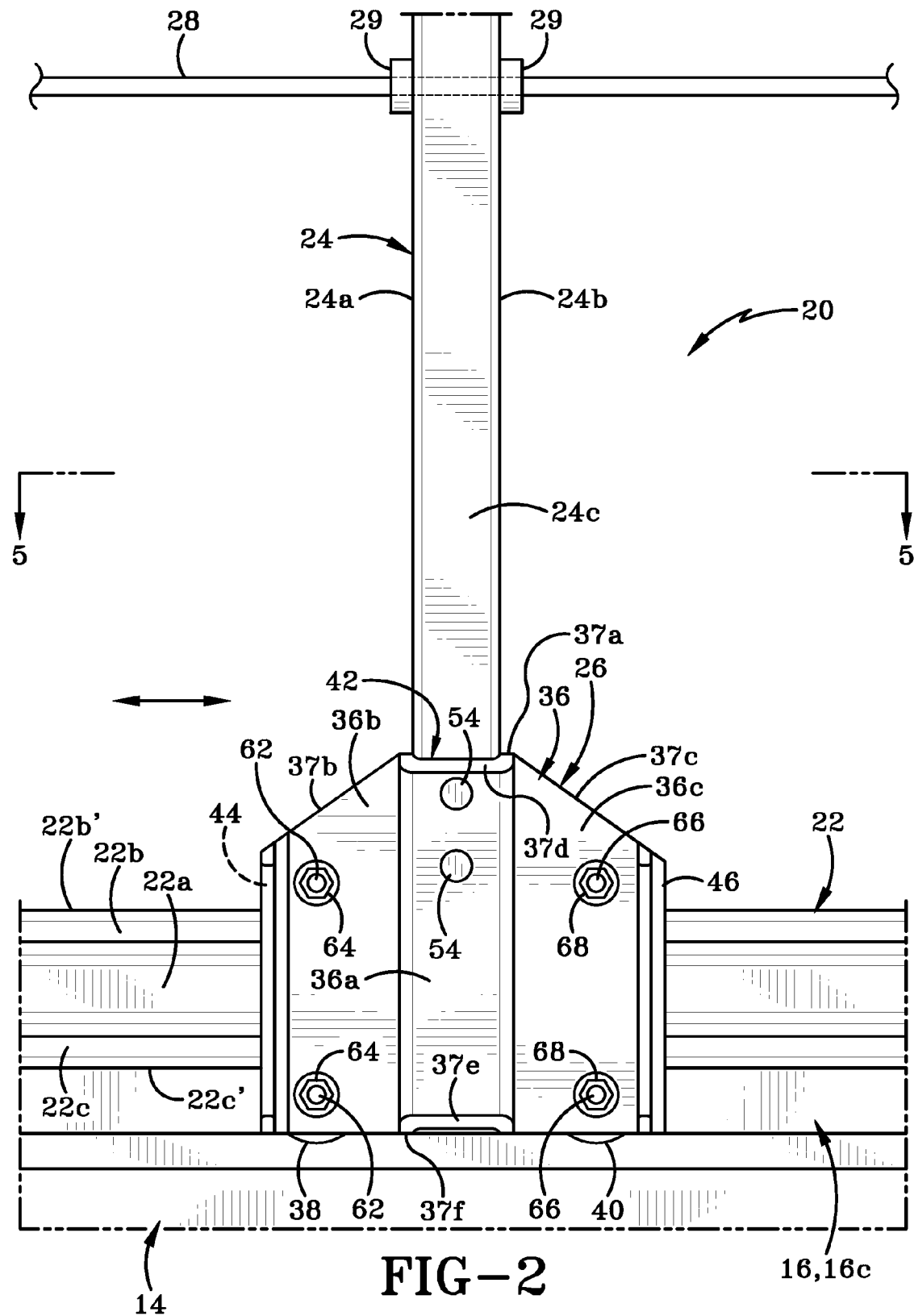
FIG. 2 is an enlarged side view of the highlighted region of FIG. 1.
Figure 3:
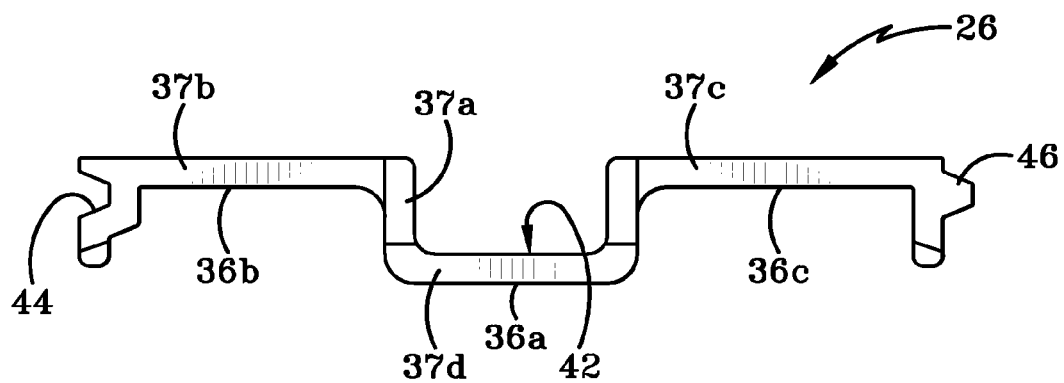
FIG. 3 is top view of the post holder used in the rail assembly.
Figure 6:
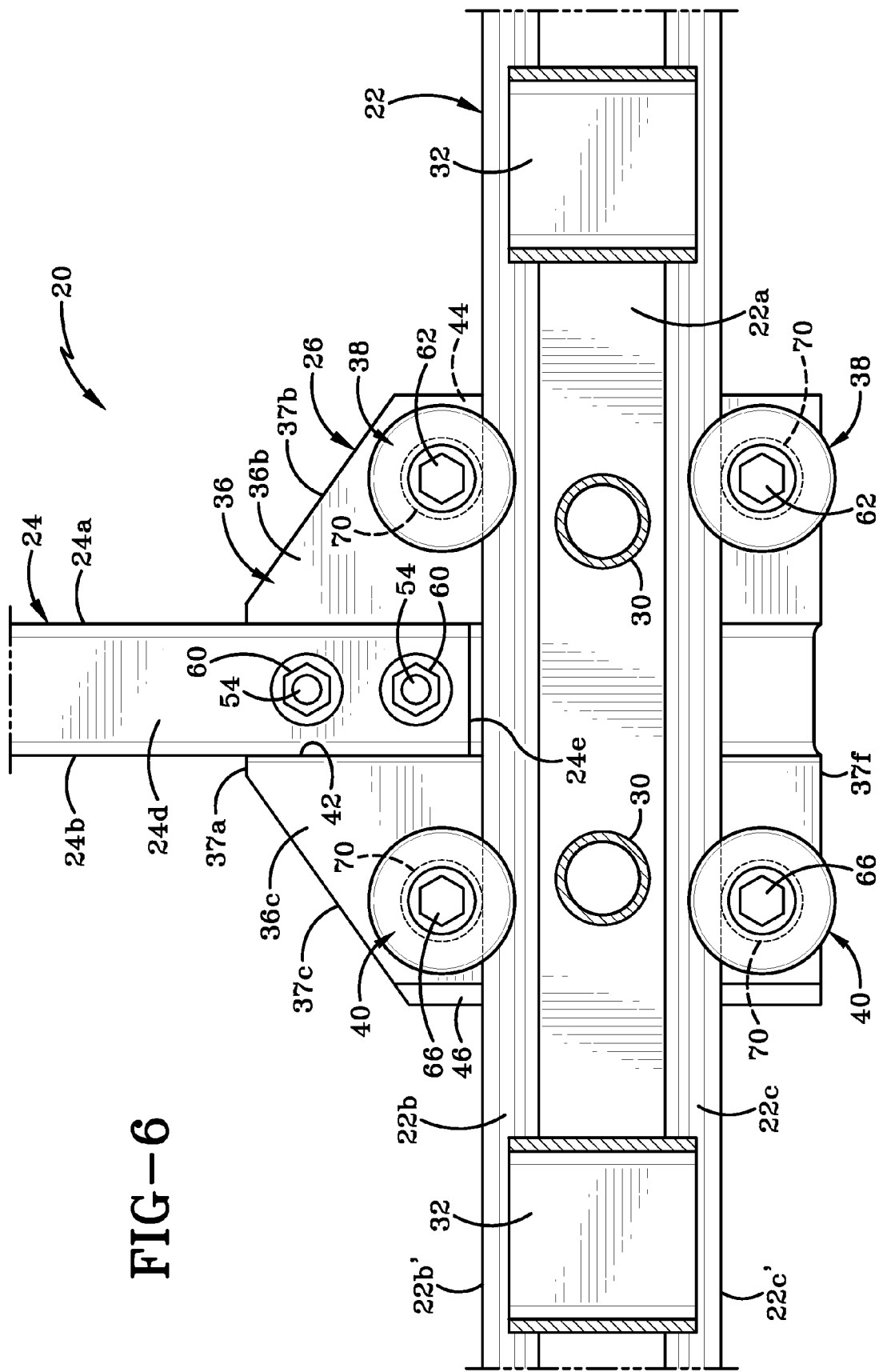
FIG. 6 is a inside section view of the post holder and post taken along line 6-6 of FIG. 5.

Post 24 may be of any suitable cross-sectional shape. For example, as illustrated in FIG. 5, post 24 is square in cross-section and has a front wall 24a, a rear wall 24b, a first side wall 24c and a second side wall 24d. A bottom end 24e (FIG. 6) of post 24 is inserted into one of the post holder assemblies 26 as will be further described herein. Post 24 extends vertically upwardly from post holder assembly 26 and the top end 24f (FIG. 1) thereof is located a distance beyond the upper load-carrying surface of bed 16. A pair of aligned holes (not shown) is defined in front and rear walls 24a, 24b of post 24 a distance beneath top end 24f and cable 28 is passed through these aligned holes, as is shown in FIG. 2. As illustrated in FIG. 2, it will be understood that some type of lug 29 may be engaged on cable 28 adjacent one or both of the front and rear walls 24a, 24b of each post 24. These lugs 29 may keep cable 28 and posts 24 in a fixed orientation relative to each other and thus ensure that the spacing between adjacent posts 24 will be substantially constant when rail assembly 20 is in the operational position (shown in FIG. 1).

It will be understood that if it is desired to string additional cables between the posts 24 then additional pairs of aligned holes will be defined in the front and rear walls 24a, 24b of each post 24. The pairs of aligned holes and therefore the cables which are threaded therethrough may be spaced at vertical intervals from each other along the length of each post 24.

Each of the plurality of post holder assemblies 26 used to engage one of the posts 24 to track 22 is substantially identical in structure and function. FIGS. 2-4B show one post holder assembly 26 in great detail. Post holder assembly 26 comprises a butterfly bracket 36 and two pairs of wheels 38 and 40.

As illustrated in FIGS. 2-4B, bracket 36 includes a central region 36a which is flanked by a first wing 36b and a second wing 36c. Central region 36a extends for a distance outwardly beyond the exterior surfaces of first and second wings 36b, 36c. Central region 36a has an upper edge 37a, first wing 36b has an upper edge 37b, and second wing 36c has an upper edge 37c. As is evident from FIG. 4, upper edges 37b, 37c slope downwardly and outwardly away from opposite ends of upper edge 37a at an angle α of about 35°. As shown in FIG. 7, upper edge 37a of bracket 36 also includes a beveled region 37d that slopes downwardly away from upper edge 37a on the exterior surface of bracket 36 at an angle β. Similarly, a lower edge of central region 36a includes a beveled region 37e which slopes upwardly away from a lower edge 37f on the exterior surface of bracket 36 at an angle β. Angle β may be around 45°.

Figure 12:
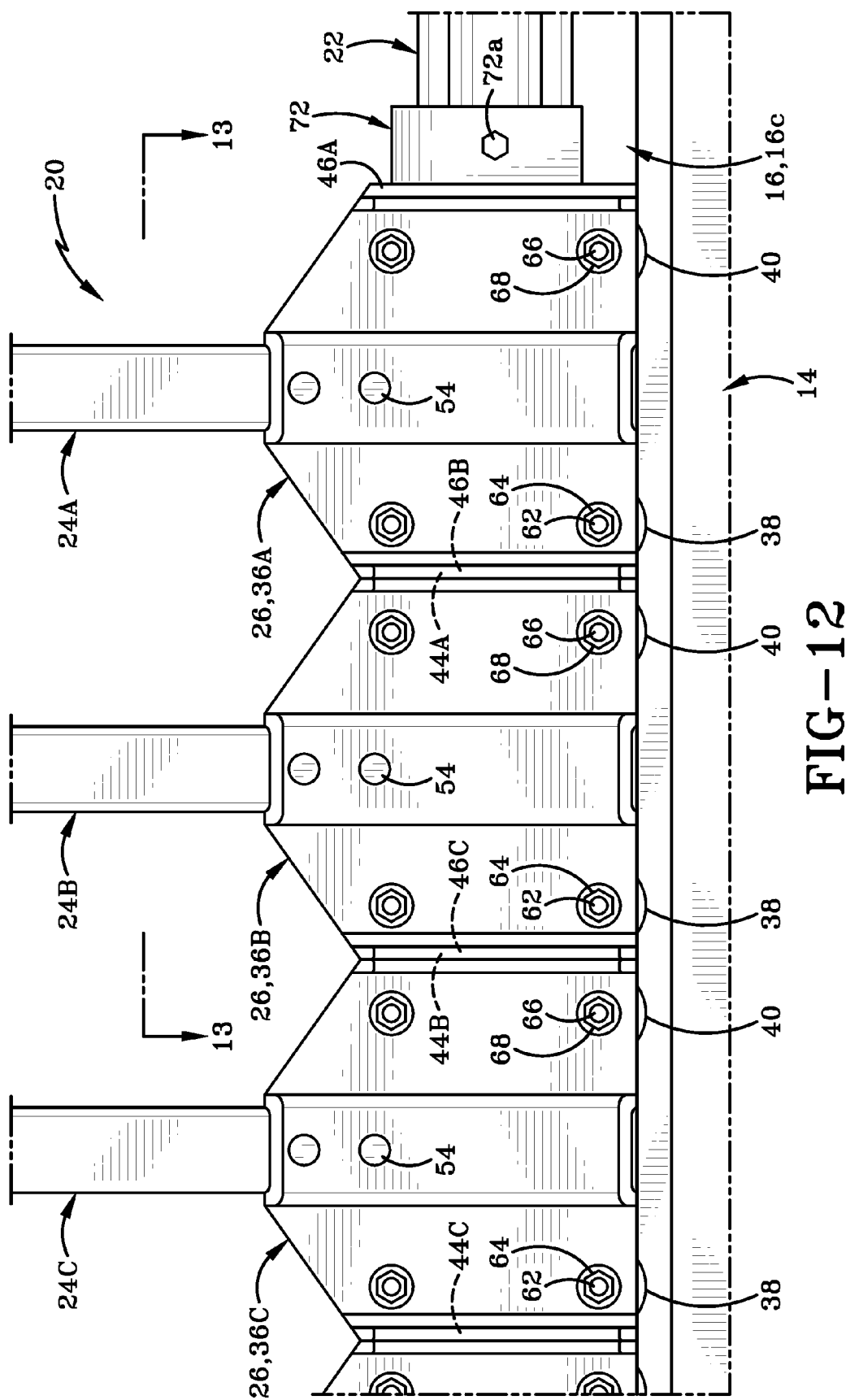
FIG. 12 is a side elevational view of the enlarged region of FIG. 11.
Figure 13:
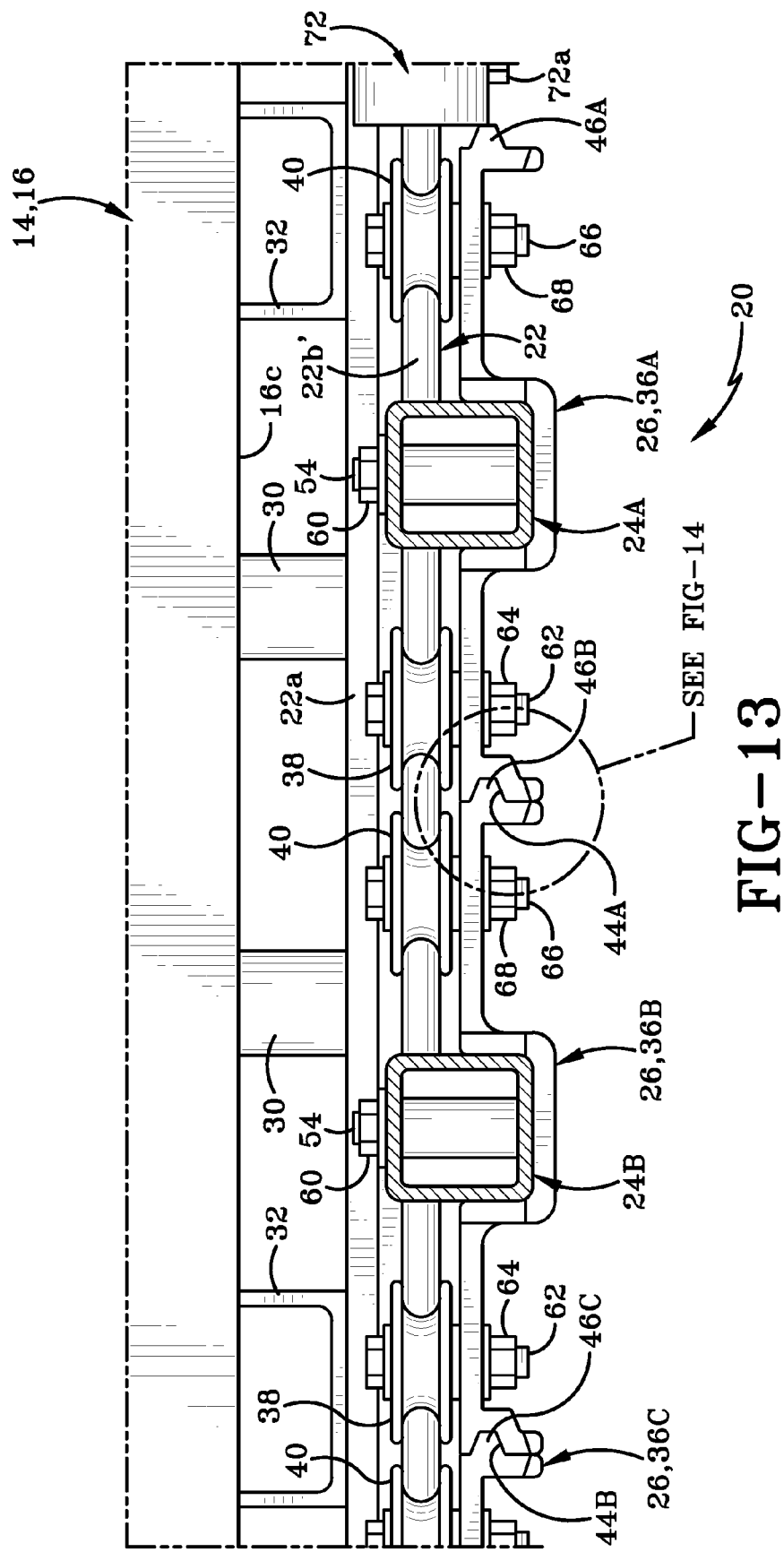
FIG. 13 is a top view of the rail assembly taken along line 13-13 of FIG. 12 and showing how adjacent post holders are interlocked with each other.
Figure 14:
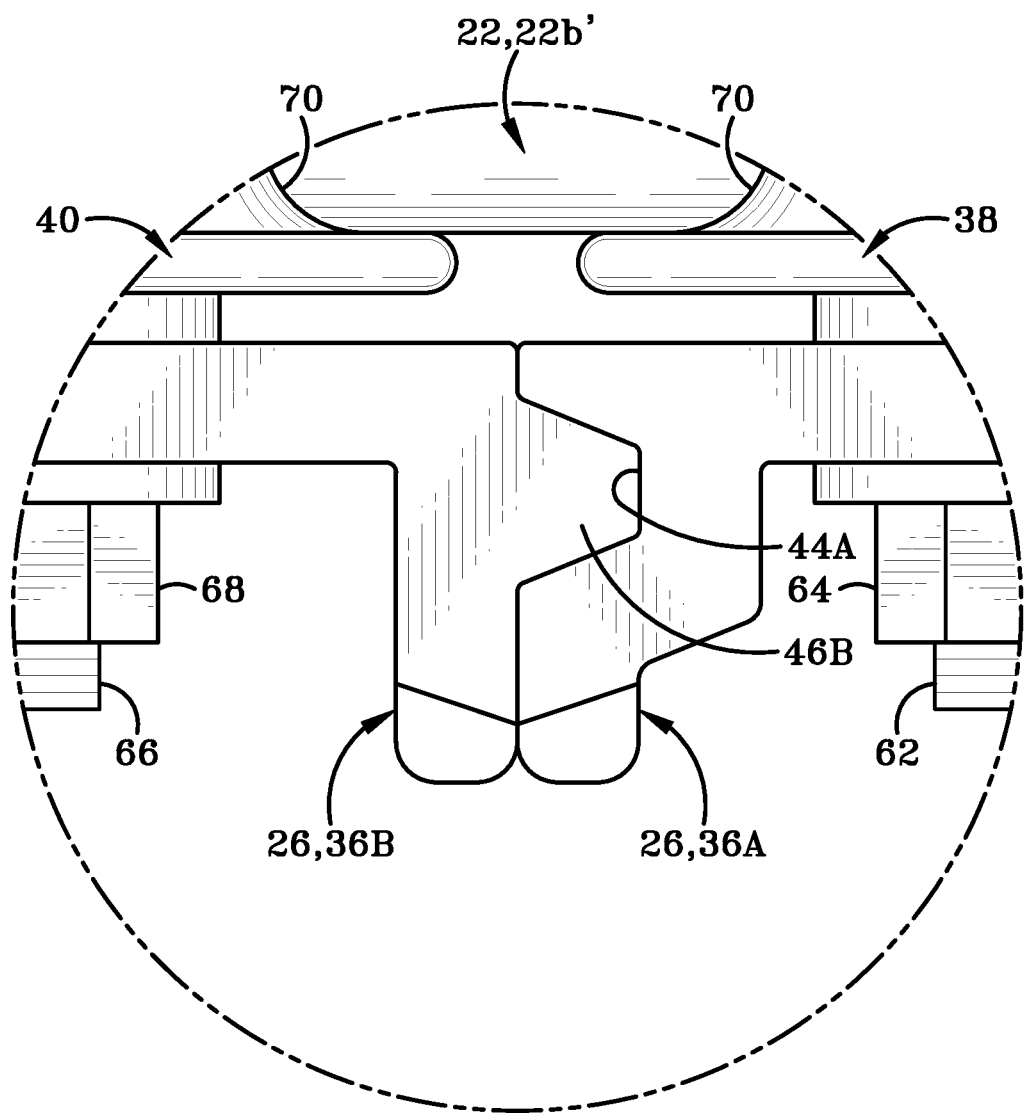
FIG. 14 is an enlarged top view of the highlighted region of FIG. 13.

Central region 36a defines a U-shaped channel 42 that is shaped and sized to receive a portion of post 24 therein. A vertical side edge of first wing 36b defines a groove 44 therein. An opposed side edge of second wing 36c includes a tongue 46 which extends outwardly therefrom for a distance. Groove 44 and tongue 46 are complementary in size and shape and are provided so that brackets 36 of adjacent post holder assemblies 26 are able to interlock with each other as is illustrated in FIGS. 12-14 and as will be later described herein.

Figure 4:
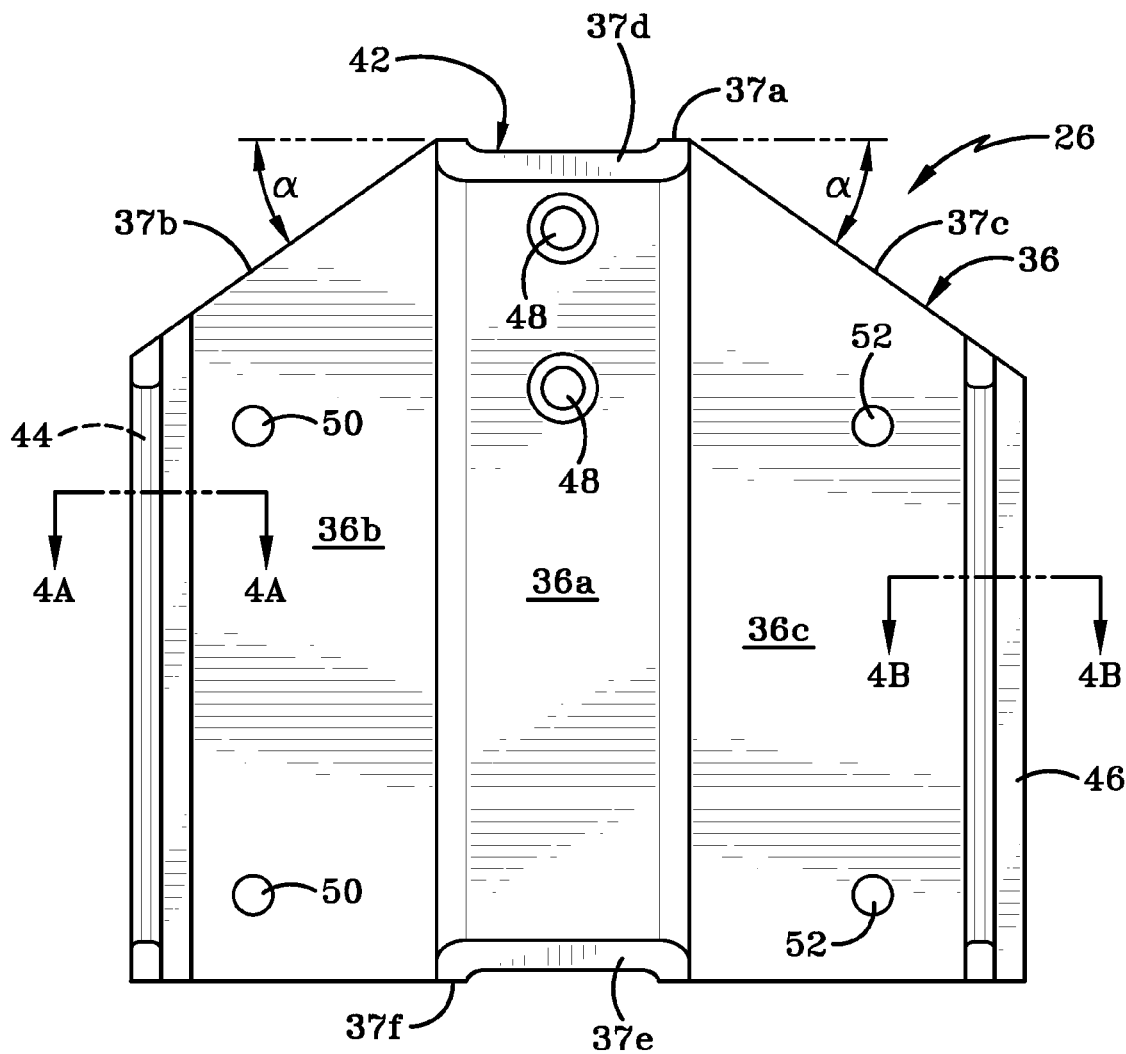
FIG. 4 is side view of the post holder.
Figure 4A:
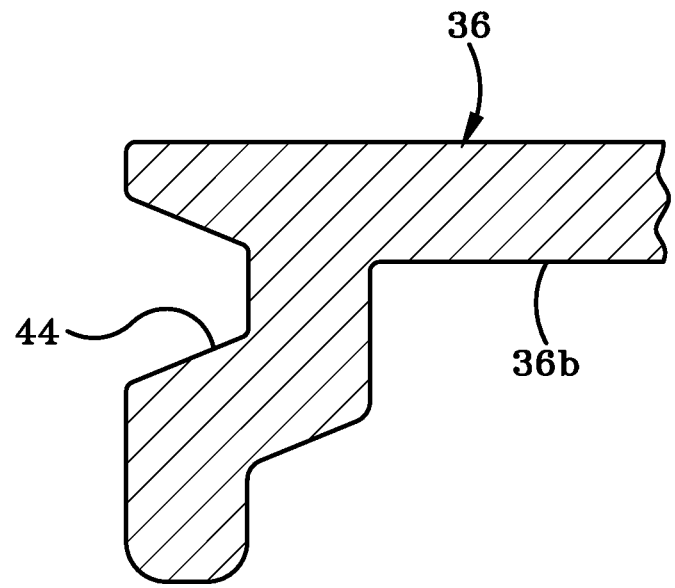
FIG. 4A is a top view of a first end of the post holder taken along line 4A 4A of FIG. 4.
Figure 4B:
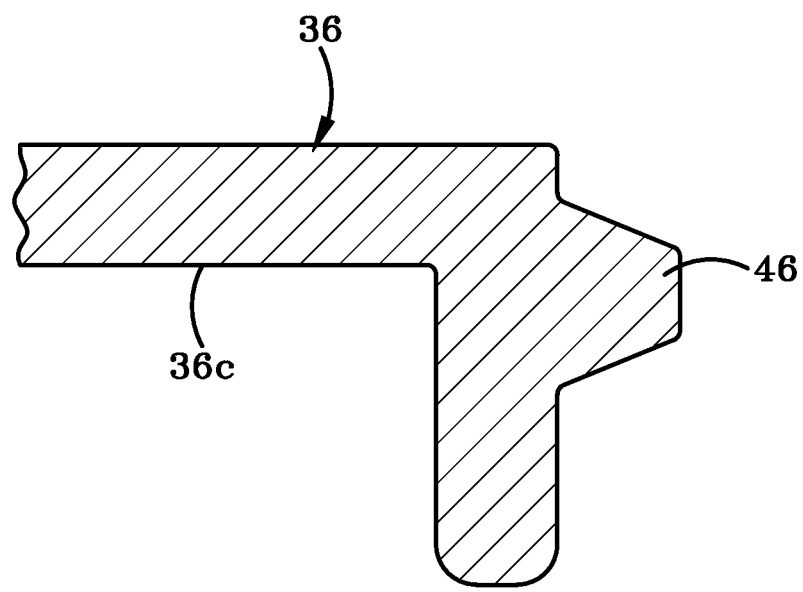
FIG. 4B is a top view of a second end of the post holder taken along line 4B-4B of FIG. 4.

FIG. 4 shows that bracket 36 defines several apertures therein. A pair of aligned and vertically spaced apart apertures 48 is defined in central region 36a. Apertures 48 are countersunk in central region 36a. A pair of vertically aligned and spaced apertures 50 is defined in first wing 36b and a pair of vertically aligned and spaced apart apertures 52 is defined in second wing 36c.

Figure 10:
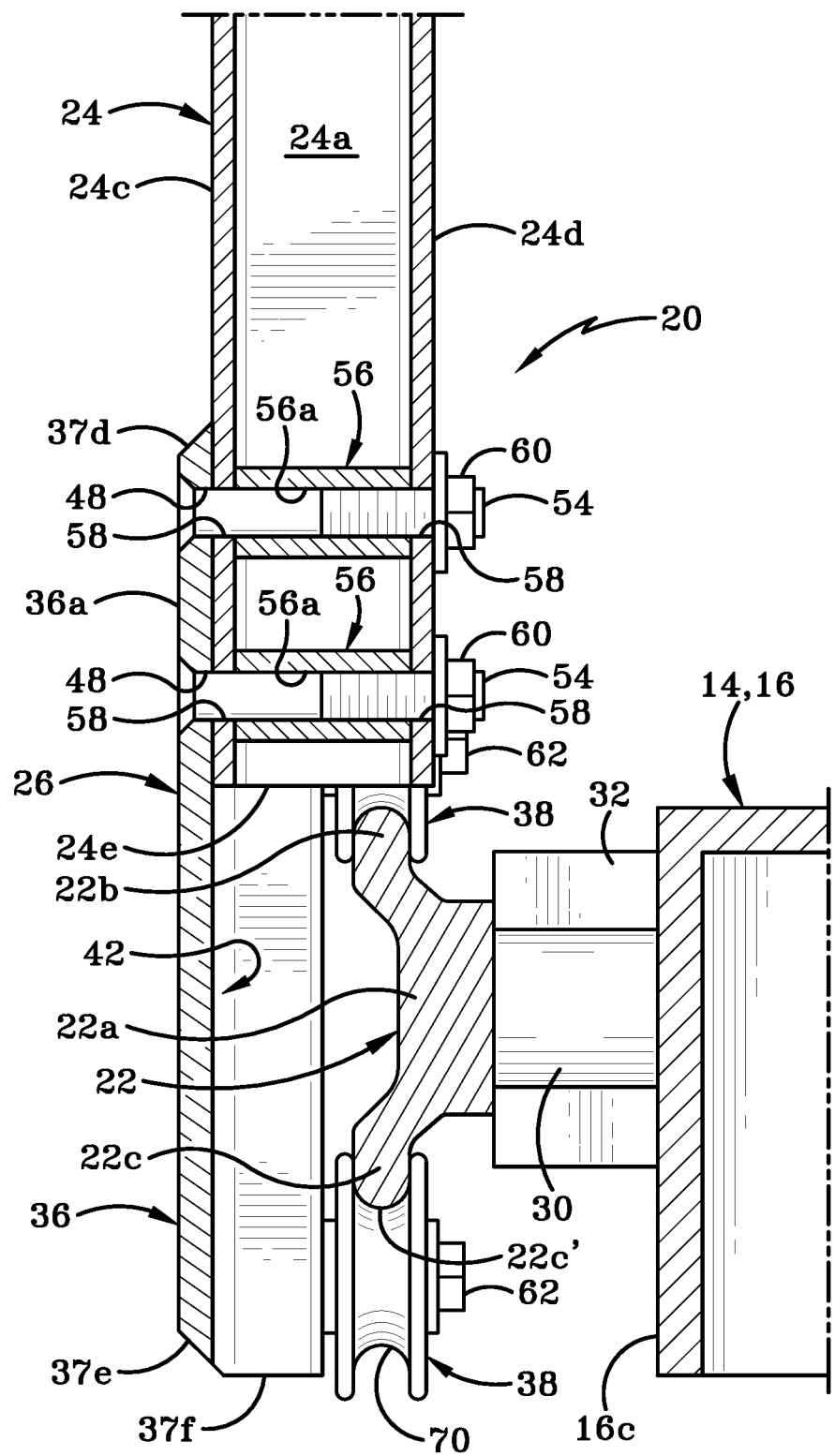
FIG. 10 is a rear cross-sectional view of the post holder and post taken along line 10-10 of FIG. 5 and showing the connection between the post holder and the post.

Apertures 48 receive fasteners 54 (FIGS. 2 and 5) therein for securing post 24 to bracket 36. A sleeve 56 may be provided between aligned apertures 58 (FIG. 10) defined in first and second side walls 24c, 24d of post and fastener 54 is passed through the bore 56a of sleeve 56. Sleeves 56 are provided to add strength and rigidity to the connection between post 24 and bracket 36. A nut and washer 60 are provided to lock each fastener 54 in place.

The two apertures 50 (FIG. 2) each receive a fastener 62 therethrough which secures one of the two wheels 38 to first wing 36b of bracket 36. A nut and washer 64 lock each fastener 62 in place. Similarly, the two apertures 52 each receive a fastener 66 therethrough to secure one of the two wheels 40 to second wing 36c of bracket 36. A nut and washer 68 lock each fastener 66 in place.

Figure 8:
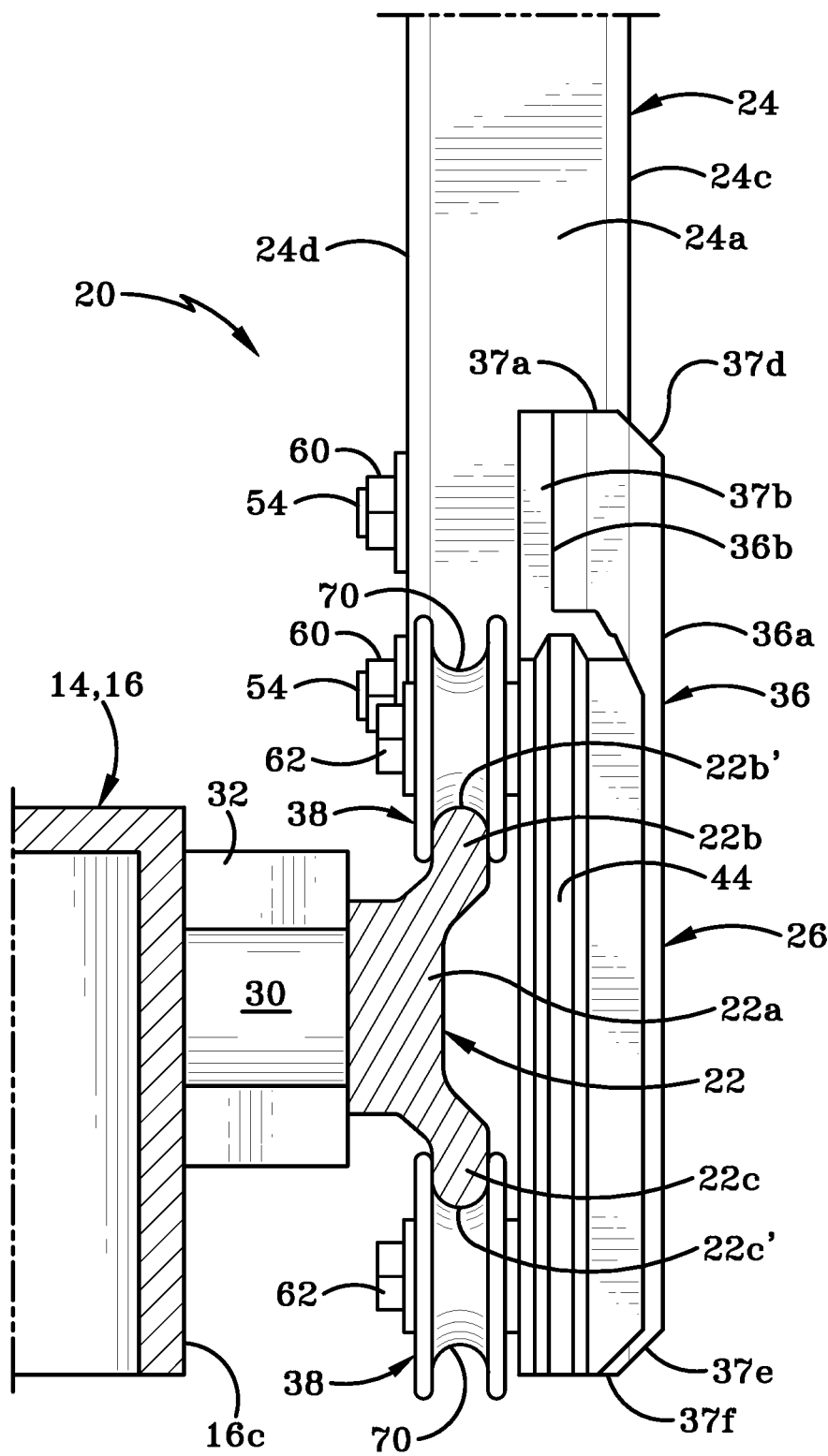
FIG. 8 is a front cross-sectional view of the post holder and post taken along line 8-8 of FIG. 5 and showing the groove portion of the post holder.
Figure 9:
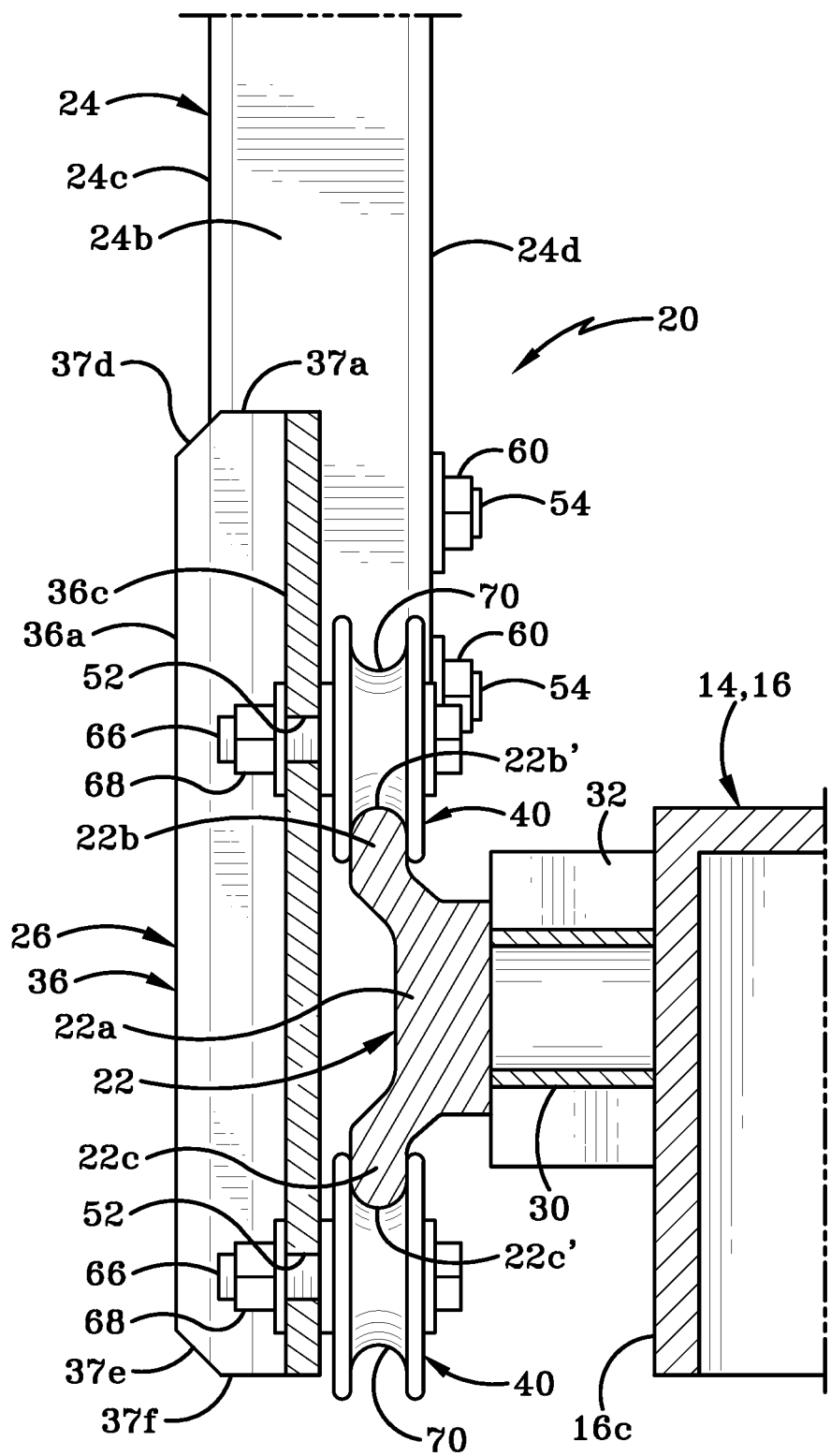
FIG. 9 is a rear cross-sectional view of the post holder and post taken along line 9-9 of FIG. 5 and showing the connection between the wheels and the post holder.

Wheels 38 and 40 are all substantially identical and each of the wheels defines a circumferential groove 70 (FIGS. 7 and 8) therein. Groove 70 is sized and shaped to be substantially complementary to the curved convex surfaces 22b' and 22c' of track 22. The interlocking of groove 70 and track 22 keeps the associated post holder assembly 26 securely engaged with track 22. (It will be understood that the groove may, instead, be provided on the track 22 and the complementary curved surface may be provided on the wheels 38, 40.)

When bracket 36 is engaged on track 22, upper and lower flanges 22b and 22c of track 22 are received in the grooves 70 of the two opposed wheels 38 or the two opposed wheels 40. Track 22 is thus captured between the upper wheel 38 and the lower wheel 38; and between the upper wheel 40 and the lower wheel 40. The engagement between wheels 38, 40 and track 22 is such that wheels 38, 40 are free to rotate about horizontal axes that extend along the relevant fasteners 62 or 66. Thus, bracket 36 and the post 24 engaged therewith is able to ride along track 22 between front end 16a and rear end 16b of bed 16.

Rail assembly 20 is installed and used in the following manner. Each post assembly 26 is slid onto an end of track 22 at one or the other of the front end 16a or rear end 16b of bed 16. Any suitable type of stop 72 is engaged with the free ends of track 22 via a bolt 72a, for example, to prevent the post assemblies 26 from sliding off the same. Alternatively, the bracket of the forwardmost post holder assembly 26, for example, may be fixedly secured to track 22 such as by welding or by being directly bolted thereto. In that instance the forwardmost post holder assembly 26 may not have any wheels 38, 40 engaged therewith.

Cable 28 is threaded through the aligned holes in the front and rear walls 24a, 24b of the various posts 24 and a lug 74 or any other type of securement device is engaged with each free end of cable 28. As indicated previously herein, other lugs 29 may be engaged with cable 28 adjacent each of the front and rear walls 24a, 24b of each post 24. A similar rail assembly 20 is engaged on the opposite side of trailer 14.

Rail assembly 20 is then ready for use. Rail assembly 20 is able to be moved between an operational position as illustrated in FIG. 1 and a storage position as illustrated in FIG. 11. In the operational position, posts 24 are spaced generally at regular intervals from each other along the side 16c of trailer 14. Cable 28 is positioned such that an operator will be substantially prevented from accidentally falling off the sides of the trailer 14. The operator may also be able to hold onto cable 28 to steady himself or herself should he or she start to fall off bed 16.

When the operator wishes to drive the vehicle, rail assembly 20 is moved from the operational position to the storage position. This motion is easily accomplished by grasping the end post, labeled 24A in FIG. 11 and push post 24A toward the front end 16a of bed 16 in the direction indicated by arrow "A". Bracket 36A (FIGS. 12, 13, and 14) includes a tongue 46A and a groove 44A. Wheels 38 and 40 on bracket 36A (FIGS. 12, 13 and 14) will roll along track 22 until bracket 36A runs into bracket 36B. The motion will cause tongue 46B of bracket 36B to move into groove 44A of bracket 36A and the two brackets 36A, 36B will become interlocked and then move as a unit. The interlocked brackets 36A, 36B will continue to be pushed in the direction of arrow "A" and toward front end 16a until bracket 36B runs into bracket 36C. When this occurs, the tongue 46C of bracket 36C will slide into groove 44B of bracket 36B and the bracket 36B and bracket 36C will become interlocked and move as a unit. The motion in the direction "A" will be continued until all of the posts 24 have been interlocked together and are located adjacent front end 16a of bed 16, as illustrated in FIG. 11.

Although not illustrated herein, one or more of post holder assemblies 26 may include any type of braking or locking mechanism to stop further motion of the wheels 38, 40 thereof along track 22. Engaging this braking or locking mechanism will retain the associated post holder assembly 26 in any desired location on track 22. So, for example, when rail assembly 20 is in the storage position shown in FIG. 11, a braking or locking mechanism on bracket 24A will hold all of the post holder assemblies 26 in the positions illustrated in this figure. If desired, a cover may be placed over all of the posts 24 and associated brackets 36 and cable 28 to stop debris, snow or the like from accumulating on the same. When rail assembly 20 is in the operational position, the overall length "L" (FIG. 1) of assembly 20 approximates the length of trailer 14. When rail assembly 20 is in the storage position, the overall length "L1" (FIG. 11) is only a portion of the overall length "L" of trailer 14. In the operational position, the length "L" of rail assembly 20 may be around 450" and when rail assembly 20 is in the storage position, the length "L1" thereof may be around 66".

When it is later desired to use rail assembly 20, the operator will remove the cover, disengage the braking or locking mechanism and move rail assembly 20 from the storage position (FIG. 11) to the operational position (FIG. 1). This is accomplished by the operator grasping the rearmost post 24A or bracket 36A and moving the same in the opposite direction to arrow "A" (FIG. 11) and toward the rear end 16b of bed 16. This motion causes wheels 38, 40 to rotate and move along track 22. As this occurs, the interlocking engagement between bracket 36A and bracket 36B is broken as the projection 46B slides out of groove 44A and bracket 36A is subsequently moved along track 22 by the associated wheels 38, 40. The continued movement of post 24A away from post 24B causes the slack in the section of cable 28 between post 24A and post 24B to be taken up and that section becomes taut. When this occurs, cable 28 will pull on post 248 and the post 24B will begin to move in the opposite direction to arrow "A". The motion of post 24B will, in turn, cause bracket 36B to move in the opposite direction to arrow "A" along track 22 with bracket 36A. This motion of bracket 36B breaks the interlocking engagement between bracket 36B and bracket 36C as tongue 46C slides out of groove 44B. Continued motion of bracket 36B and the associated post 24B will cause the next section of cable 28 between posts 24B and 24C to become taut and pull on post 24C, causing post 24C to move in the opposite direction to arrow "A" with post 24B.

The above sequence of events is continued until bracket 36A is adjacent rear end 16b of bed 16. The operator will then engage the braking or locking mechanism on bracket 36A and rail assembly 20 is then ready for use as a safety rail. When in the operational position, posts 24 are around 87" (about 7') apart from each other.

Figure 15:
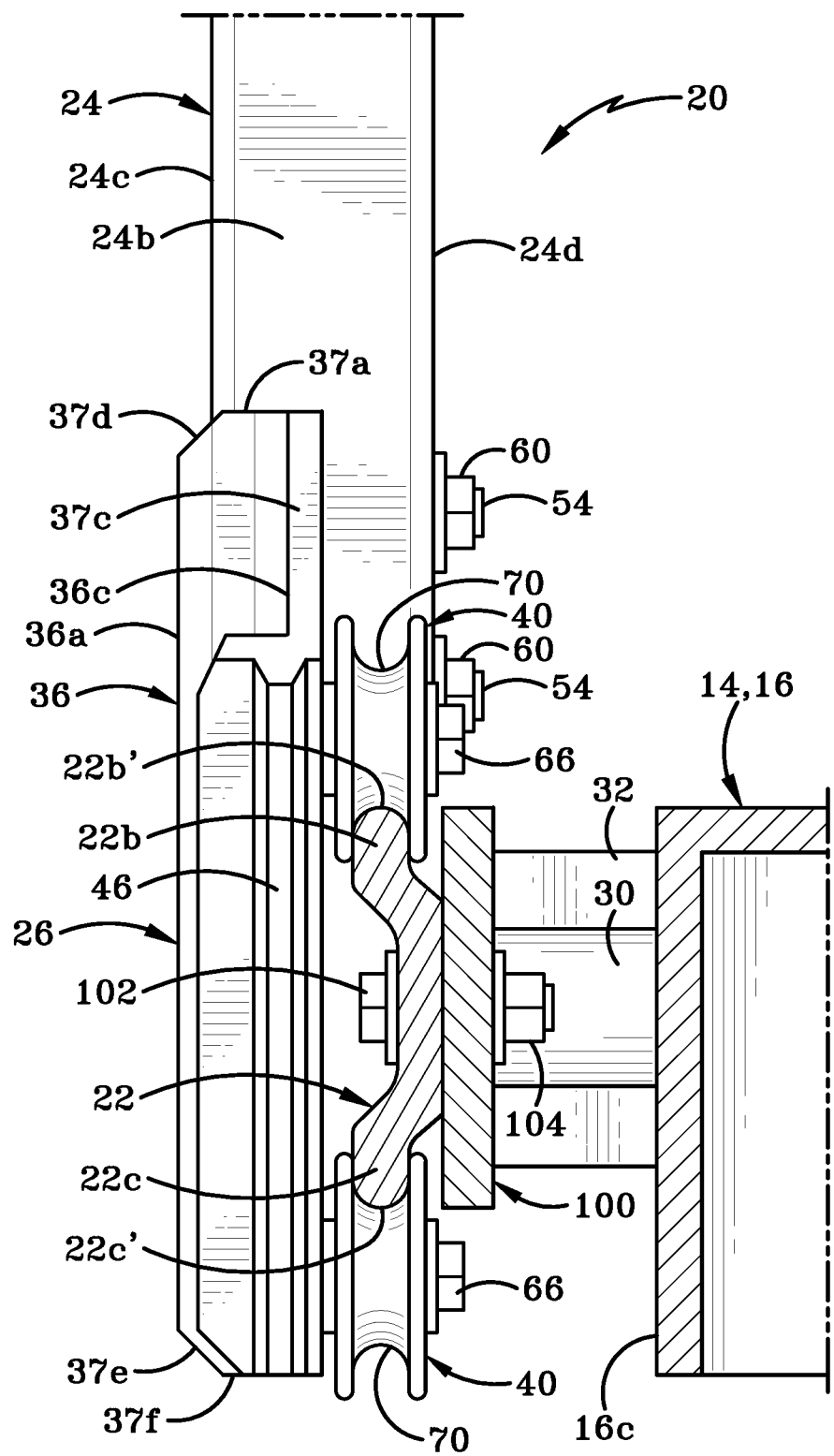
FIG. 15 is a rear view of a post holder and post engaged on a pre-exiting rub rail on a trailer and showing the track connected to that rub rail.

FIG. 15 shows a different configuration for securing rail assembly 20 to a trailer bed 16. In this particular instance, trailer 14 includes a rub rail 100 which is permanently affixed to side 16c of bed 16. Rub rail 100 runs for substantially the entire length of bed 16 and is spaced a distance away from side 16c. In this instance, track 22 is fixedly secured to rub rail 100 by way of any suitable means, such as the bolts 102 and nuts 104 illustrated in this figure. All other components of rail assembly 20 are structured and function as described above.

It will be understood that while rail assembly 20 has been described herein as being movable into a storage position, it will be understood that in this storage position the plurality of post assemblies 26 and posts 24 may be positioned proximate rear end 16b of trailer 16 or at any point along the length of trailer 16 between the front and rear ends 16a, 16b thereof.

It will further be understood that in addition or instead of having a rail assembly 20 engaged along one or both sides of the trailer 16, a similar but shorter rail assembly 20 may be provided along front end 16a of trailer 16 and/or along rear end 16b of bed 16. Alternatively, rail assembly 20 may be engaged along only a part of one of the sides 16c, front end 16a, or rear end 16b of bed 16. Still further, tracks 22 may be substantially continuous around the perimeter of some or all of the front end 16a, sides 16c and rear end 16b of bed 16 and a related number of posts 24 and post holder assemblies 26 may be engaged on that substantially continuous track 22. In this instance, instead of the railing (posts 24 and post holder assemblies 26) only being positioned along one of the sides 16c, front end 16a or rear end 16b, the railing may be positioned along more than one of the sides, front end or rear end; or all of the sides, front end and rear end.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A safety rail for a flatbed trailer comprising:
   a track adapted to be engaged on the flatbed trailer;
   a plurality of post holder assemblies, where each post holder assembly is engaged with the track and is selectively movable therealong;
   a plurality of posts, with each post being engaged with one of the post holder assemblies; and
   a cable threaded through an aperture in each of the posts; and
   wherein each post holder assembly includes a bracket and the bracket has a first side edge and a second side edge; and the first side edge defines a groove therein and the second side edge includes a tongue which projects outwardly therefrom; and wherein the tongue and the groove are complementary in size and shape.

2. The safety rail as defined in claim 1, wherein each post holder assembly includes at least one wheel that engages the track and is rotatable therealong when the post holder assembly is moved along the track.

3. The safety rail as defined in claim 1, wherein the at least one wheel includes a circumferential groove and the track includes a complementary convex surface that is received in the groove.

4. The safety rail as defined in claim 1, wherein the brackets of adjacent post holder assemblies interlock with each other when the safety rail is moved into a storage position.

5. The safety rail as defined in claim 4, wherein when adjacent post holder assemblies are interlocked, the tongue on a first one of the adjacent post holder assemblies is received in the groove of a second one of the adjacent post holder assemblies.

6. The safety rail as defined in claim 1, wherein the bracket defines a channel therein and the channel is complementary in size and shape to a portion of the associated post and the portion of the associated post is received in the channel.

7. In combination:
   a flatbed trailer having a front end, a rear end and opposed sides;
   a rail assembly provided on the trailer, wherein the rail assembly is movable between an operational position and a storage position; and the rail assembly includes:
   a plurality of post holder assemblies positioned along one or more of the front end, rear end or the sides of the trailer;
   a post engaged with each of the post holder assemblies; and
   a cable extending between the posts; and wherein the post holder assemblies are movable along the one or more of the front end, rear end or sides of the trailer when the rail assembly is moved between the operational and storage positions; and wherein adjacent post holder assemblies are spaced a distance apart from each other when the rail assembly is in the operational position and are spaced in close proximity to each other when the rail assembly is in the storage position; and wherein each post holder assembly includes a bracket having a first side edge and a second side edge; and wherein a groove is defined along the first side edge and a tongue extends outwardly from the second side edge; and wherein the groove and tongue are complementary in size and shape.

8. The combination as defined in claim 7, further comprising a track mounted along the one of the front end, rear end or the sides of the trailer; and wherein the post holder assemblies are engaged with the track and are movable therealong.

9. The combination as defined in claim 7, wherein each post holder assembly includes:
   a bracket; and
   a first wheel mounted on the bracket; wherein the first wheel engages the track and rotates therealong as the rail assembly is moved between the operational and storage positions.

10. The combination as defined in claim 9, wherein each post holder assembly includes a second wheel that is spaced apart from and vertically aligned with the first wheel; and wherein the first wheel rides along a top region of the track and the second wheel rides along a bottom region of the track as the rail assembly is moved therealong.

11. The combination as defined in claim 7, wherein each post holder assembly defines a channel therein that is complementary in size and shape to a portion of one of the posts; and wherein the portion of the post is received in the channel.

12. The combination as defined in claim 7, wherein adjacent post holder assemblies are interlocked together when the rail assembly is in the storage position and the tongue on a first one of the adjacent post holder assemblies is received in the groove on a second one of the adjacent post holder assemblies.

13. The combination as defined in claim 7, wherein a section of the cable is folded between each pair of adjacent posts when the rail assembly is in the storage position and the sections of the cable are substantially straightened and extend substantially horizontally between each pair of adjacent posts when the rail assembly is in the operational position.

14. A method of providing a safety rail along an edge of a flatbed trailer comprising the steps of:
   providing a rail assembly having a plurality of post holder assemblies, a post engaged with each of the post holder assemblies, and a cable extending between the posts;
   mounting a track adjacent the edge of the flatbed trailer;
   engaging each of the post holder assemblies on the track;
   moving the post holder assemblies apart from each other along the track and into an operational position; and straightening sections of the cable as the post holders move apart.

15. The method as defined in claim 14, wherein the step of engaging each of the post holder assemblies on the track includes inserting the track between a pair of spaced apart wheels provided on each post holder assembly.

16. The method as defined in claim 15, wherein the step of moving the post holder assemblies apart includes rolling the wheels along the track.

17. The method as defined in claim 14, including moving the rail assembly from the operational position to a storage position by moving the post holder assemblies toward each other and into interlocking engagement with each other.

18. The method as defined in claim 17, wherein the step of interlocking the post holder assemblies together includes inserting a tongue along one side edge of a first post holder assembly into a complementary groove defined along a second side edge of an adjacent second post holder.

* * * * *